(12) United States Patent
Negley (10) Patent No.: US 8,011,818 B2
(45) Date of Patent: Sep. 6, 2011

(54) LIGHTING DEVICE INCLUDING PLURAL OPTICAL STRUCTURES HAVING AT LEAST TWO DIFFERENT REFRACTION INDICES, AND LIGHTING METHODS

(75) Inventor: Gerald H. Negley, Durham, NC (US)

(73) Assignee: Cree, Inc., Durham, NC (US)

( * ) Notice: Subject to any disclaimer, the term of this patent is extended or adjusted under 35 U.S.C. 154(b) by 173 days.

(21) Appl. No.: 11/939,047

(22) Filed: Nov. 13, 2007

(65) Prior Publication Data

US 2008/0112183 A1    May 15, 2008

Related U.S. Application Data

(60) Provisional application No. 60/858,558, filed on Nov. 13, 2006.

(51) Int. Cl.
*F21V 7/04* (2006.01)
*F21S 4/00* (2006.01)

(52) U.S. Cl. ........ 362/613; 362/612; 362/230; 362/244; 362/249.02; 362/249.06; 40/543; 40/546; 40/547

(58) Field of Classification Search .................. 362/612, 362/613, 230, 240, 244, 246, 249.02, 249.06; 40/543, 546, 547
See application file for complete search history.

(56) References Cited

U.S. PATENT DOCUMENTS

| | | | | |
|---|---|---|---|---|
| 1,707,965 A * | 4/1929 | Scantlebury | .................... | 40/546 |
| 2,347,665 A * | 5/1944 | Christensen et al. | ........... | 40/363 |
| 2,712,188 A * | 7/1955 | Neugass | ......................... | 40/546 |
| 2,727,327 A * | 12/1955 | Colby | ............................. | 40/546 |
| 3,491,245 A * | 1/1970 | Hardesty | .................. | 250/227.11 |
| 4,422,719 A * | 12/1983 | Orcutt | ........................... | 385/123 |
| 4,714,983 A * | 12/1987 | Lang | ................................ | 362/27 |
| 5,136,483 A * | 8/1992 | Schoniger et al. | ............ | 362/545 |
| 5,390,436 A * | 2/1995 | Ashall | ............................ | 40/546 |
| 5,572,818 A * | 11/1996 | Churchill | ....................... | 40/547 |
| 5,664,862 A * | 9/1997 | Redmond et al. | ............. | 362/625 |
| 5,678,334 A * | 10/1997 | Schoniger | ....................... | 40/546 |
| 5,876,107 A | 3/1999 | Parker et al. | | |

(Continued)

FOREIGN PATENT DOCUMENTS

CN    2310926    3/1999

(Continued)

OTHER PUBLICATIONS

U.S. Appl. No. 11/613,692, filed Dec. 20, 2006.

(Continued)

*Primary Examiner* — Ismael Negron
(74) *Attorney, Agent, or Firm* — Burr & Brown (57) ABSTRACT

A lighting device, comprising at least one solid state light emitter and one (or more) optical device(s) which (each) comprises at least first, second and third optical structures, first and second surfaces of the second structure being in contact with a surface of the first structure and a surface of the third structure, respectively. The third structure has at least one optical feature. The light emitter is positioned, the optical feature is positioned, and the regions of the structures have indices of refraction, such that if the light emitter is illuminated, at least a portion of the emitted light will enter into the second optical device structure and exit from the optical feature on the third structure. Also, a method of lighting comprising illuminating a light emitter in such a device.

41 Claims, 4 Drawing Sheets

U.S. PATENT DOCUMENTS

| | | | |
|---|---|---|---|
| 5,882,774 A | 3/1999 | Jonza et al. | |
| 5,998,925 A | 12/1999 | Shimizu et al. | |
| 6,252,254 B1 * | 6/2001 | Soules et al. | 257/89 |
| 6,319,425 B1 * | 11/2001 | Tasaki et al. | 252/301.36 |
| 6,533,429 B2 * | 3/2003 | Yoneda | 362/600 |
| 6,600,175 B1 * | 7/2003 | Baretz et al. | 257/100 |
| 6,637,905 B1 * | 10/2003 | Ng et al. | 362/601 |
| 7,004,610 B2 | 2/2006 | Yamashita et al. | |
| 7,126,274 B2 | 10/2006 | Shimizu et al. | |
| 7,213,940 B1 | 5/2007 | Van De Ven et al. | |
| 7,215,074 B2 | 5/2007 | Shimizu et al. | |
| 7,278,756 B2 * | 10/2007 | Leu et al. | 362/260 |
| 7,402,943 B2 * | 7/2008 | Sakuma et al. | 313/503 |
| 2001/0038532 A1 | 11/2001 | Harbers et al. | |
| 2005/0024847 A1 | 2/2005 | Ahn et al. | |
| 2005/0117320 A1 * | 6/2005 | Leu et al. | 362/31 |
| 2005/0127385 A1 * | 6/2005 | Reeh et al. | 257/98 |
| 2005/0285506 A1 * | 12/2005 | Sakuma et al. | 313/503 |
| 2006/0002141 A1 | 1/2006 | Ouderkirk et al. | |
| 2007/0098969 A1 | 5/2007 | Ansems et al. | |
| 2007/0245607 A1 * | 10/2007 | Awai et al. | 40/546 |
| 2008/0225203 A1 * | 9/2008 | Kim | 349/65 |

FOREIGN PATENT DOCUMENTS

| | | |
|---|---|---|
| CN | 1461394 | 12/2003 |
| EP | 0 936 682 | 8/1999 |
| EP | 1 329 664 | 7/2003 |
| GB | 2030750 A * | 4/1980 |
| WO | 01/84046 | 11/2001 |
| WO | 2005/019724 | 3/2005 |
| WO | WO 2005027231 A1 * | 3/2005 |
| WO | 2005/054915 | 6/2005 |

OTHER PUBLICATIONS

U.S. Appl. No. 11/614,180, filed Dec. 21, 2006.
U.S. Appl. No. 11/613,714, filed Dec. 20, 2006.
U.S. Appl. No. 11/613,733, filed Dec. 20, 2006.
U.S. Appl. No. 11/624,811, filed Jan. 19, 2007.
U.S. Appl. No. 11/626,483, filed Jan. 24, 2007.
U.S. Appl. No. 11/743,754, filed May 3, 2007.
U.S. Appl. No. 11/751,982, filed May 22, 2007.
U.S. Appl. No. 11/753,103, filed May 24, 2007.
U.S. Appl. No. 11/751,990, filed May 22, 2007.
U.S. Appl. No. 11/736,761, filed Apr. 18, 2007.
U.S. Appl. No. 11/736,799, filed Apr. 18, 2007.
U.S. Appl. No. 11/737,321, filed Apr. 19, 2007.
U.S. Appl. No. 11/755,162, filed May 30, 2007.
U.S. Appl. No. 11/854,744, filed Sep. 13, 2007.
U.S. Appl. No. 11/936,163, filed Nov. 7, 2007.
U.S. Appl. No. 11/843,243, filed Aug. 22, 2007.
U.S. Appl. No. 11/948,021, filed Nov. 30, 2007.
U.S. Appl. No. 11/870,679, filed Oct. 11, 2007.
U.S. Appl. No. 11/951,626, filed Dec. 6, 2007.
U.S. Appl. No. 12/035,604, filed Feb. 22, 2008.

* cited by examiner

LIGHTING DEVICE INCLUDING PLURAL OPTICAL STRUCTURES HAVING AT LEAST TWO DIFFERENT REFRACTION INDICES, AND LIGHTING METHODS

CROSS-REFERENCE TO RELATED APPLICATIONS

This application claims the benefit of U.S. Provisional Patent Application No. 60/858,558, filed Nov. 13, 2006, the entirety of which is incorporated herein by reference.

FIELD OF THE INVENTION(S)

The present inventive subject matter relates to lighting devices which include solid state light emitters. In some aspects, the present inventive subject matter relates to lighting devices which include LEDs and/or lumiphors.

BACKGROUND OF THE INVENTION(S)

A large proportion (some estimates are as high as twenty-five percent) of the electricity generated in the United States each year goes to lighting. Accordingly, there is an ongoing need to provide lighting which is more energy-efficient. It is well-known that incandescent light bulbs are very energy-inefficient light sources—about ninety percent of the electricity they consume is released as heat rather than light. Fluorescent light bulbs are more efficient than incandescent light bulbs (by a factor of about 10) but are still less efficient than solid state light emitters, such as light emitting diodes.

In addition, as compared to the normal lifetimes of solid state light emitters, e.g., light emitting diodes, incandescent light bulbs have relatively short lifetimes, i.e., typically about 750-1000 hours. In comparison, light emitting diodes, for example, have typical lifetimes between 50,000 and 70,000 hours. Fluorescent bulbs have longer lifetimes (e.g., 10,000-20,000 hours) than incandescent lights, but provide less favorable color reproduction.

Color reproduction is typically measured using the Color Rendering Index (CRI Ra). CRI Ra is a modified average of the relative measurement of how the color rendition of an illumination system compares to that of a reference radiator when illuminating eight reference colors, i.e., it is a relative measure of the shift in surface color of an object when lit by a particular lamp. The CRI Ra equals 100 if the color coordinates of a set of test colors being illuminated by the illumination system are the same as the coordinates of the same test colors being irradiated by the reference radiator. Daylight has a high CRI (Ra of approximately 100), with incandescent bulbs also being relatively close (Ra greater than 95), and fluorescent lighting being less accurate (typical Ra of 70-80). Certain types of specialized lighting have very low CRI (e.g., mercury vapor or sodium lamps have Ra as low as about 40 or even lower). Sodium lamps are used, e.g., to light highways—driver response time, however, significantly decreases with lower CRI Ra values (for any given brightness, legibility decreases with lower CRI Ra).

Another issue faced by conventional light fixtures is the need to periodically replace the lighting devices (e.g., light bulbs, etc.). Such issues are particularly pronounced where access is difficult (e.g., vaulted ceilings, bridges, high buildings, traffic tunnels) and/or where change-out costs are extremely high. The typical lifetime of conventional fixtures is about 20 years, corresponding to a light-producing device usage of at least about 44,000 hours (based on usage of 6 hours per day for 20 years). Light-producing device lifetime is typically much shorter, thus creating the need for periodic change-outs.

Accordingly, for these and other reasons, efforts have been ongoing to develop ways by which solid state light emitters can be used in place of incandescent lights, fluorescent lights and other light-generating devices in a wide variety of applications. In addition, where light emitting diodes (or other solid state light emitters) are already being used, efforts are ongoing to provide light emitting diodes (or other solid state light emitters) which are improved, e.g., with respect to energy efficiency, color rendering index (CRI Ra), contrast, efficacy (lm/W), low cost, and/or with longer duration of service.

A variety of solid state light emitters are well-known.

For example, one type of solid state light emitter is a light emitting diode.

Light emitting diodes are semiconductor devices that convert electrical current into light. A wide variety of light emitting diodes are used in increasingly diverse fields for an ever-expanding range of purposes.

More specifically, light emitting diodes are semiconducting devices that emit light (ultraviolet, visible, or infrared) when a potential difference is applied across a p-n junction structure. There are a number of well-known ways to make light emitting diodes and many associated structures, and the present inventive subject matter can employ any such devices. By way of example, Chapters 12-14 of Sze, Physics of Semiconductor Devices, (2d Ed. 1981) and Chapter 7 of Sze, Modern Semiconductor Device Physics (1998) describe a variety of photonic devices, including light emitting diodes.

The expression "light emitting diode" is used herein to refer to the basic semiconductor diode structure (i.e., the chip). The commonly recognized and commercially available "LED" that is sold (for example) in electronics stores typically represents a "packaged" device made up of a number of parts. These packaged devices typically include a semiconductor based light emitting diode such as (but not limited to) those described in U.S. Pat. Nos. 4,918,487; 5,631,190; and 5,912,477; various wire connections, and a package that encapsulates the light emitting diode.

As is well-known, a light emitting diode produces light by exciting electrons across the band gap between a conduction band and a valence band of a semiconductor active (light-emitting) layer. The electron transition generates light at a wavelength that depends on the band gap. Thus, the color of the light (wavelength) emitted by a light emitting diode depends on the semiconductor materials of the active layers of the light emitting diode.

Although the development of light emitting diodes has in many ways revolutionized the lighting industry, some of the characteristics of light emitting diodes have presented challenges, some of which have not yet been fully met.

There is an ongoing need for ways to use solid state light emitters, e.g., light emitting diodes, in a wider variety of applications, with greater energy efficiency, with improved color rendering index (CRI Ra), with improved efficacy (lm/W), and/or with longer duration of service.

BRIEF SUMMARY OF THE INVENTION(S)

According to a first aspect of the present inventive subject matter, there is provided a lighting device, comprising:
at least a first solid state light emitter; and
at least a first optical device,
the first optical device comprising at least a first optical device structure, a second optical device structure and a third optical device structure, the first optical device structure comprising a first structure first surface and a first structure second surface, the second optical device structure comprising a second structure first surface and a second structure second surface, the third optical device structure comprising a third structure first surface and a third structure second surface, the first structure second surface being in contact with the second structure first surface, the second structure second surface being in contact with the third structure first surface, a first region of the first optical device structure comprising the first structure second surface, a first region of the second optical device structure comprising the second structure first surface, a second region of the second optical device structure comprising the second structure second surface, a first region of the third optical device structure comprising the third structure first surface, the first region of the first optical device structure having a first optical device structure first index of refraction, the first region of the second optical device structure having a second optical device structure first index of refraction, the second region of the second optical device structure having a second optical device structure second index of refraction, the first region of the third optical device structure having a third optical device structure first index of refraction, the second optical device structure first index of refraction being greater than the first optical device structure first index of refraction, the second optical device structure second index of refraction being greater than the third optical device structure first index of refraction, the first solid state light emitter being positioned and oriented such that if the first solid state light emitter is illuminated so as to emit first solid state emitter light, at least a portion of the first solid state emitter light will enter into the second optical device structure, the third optical device structure comprising at least a first optical feature, the first optical feature being positioned such that if the first solid state light emitter is illuminated so as to emit first solid state emitter light, whereby at least a portion of the first solid state emitter light will enter into the second optical device structure, at least some of the portion of the first solid state emitter light will exit the third optical device structure from the third structure second surface.

According to a second aspect of the present inventive subject matter, there is provided a method of lighting, comprising:

illuminating at least a first solid state light emitter of a lighting device to emit first solid state emitter light, the first solid state light emitter being positioned and oriented such that at least a portion of the first solid state emitter light will enter into a second optical device structure of a first optical device, the first optical device comprising at least a first optical device structure, the second optical device structure and a third optical device structure, the first optical device structure comprising a first structure first surface and a first structure second surface, the second optical device structure comprising a second structure first surface and a second structure second surface, the third optical device structure comprising a third structure first surface and a third structure second surface, the first structure second surface being in contact with the second structure first surface, the second structure second surface being in contact with the third structure first surface, a first region of the first optical device structure comprising the first structure second surface, a first region of the second optical device structure comprising the second structure first surface, a second region of the second optical device structure comprising the second structure second surface, a first region of the third optical device structure comprising the third structure first surface, the first region of the first optical device structure having a first optical device structure first index of refraction, the first region of the second optical device structure having a second optical device structure first index of refraction, the second region of the second optical device structure having a second optical device structure second index of refraction, the first region of the third optical device structure having a third optical device structure first index of refraction, the second optical device structure first index of refraction being greater than the first optical device structure first index of refraction, the second optical device structure second index of refraction being greater than the third optical device structure first index of refraction, the third optical device structure comprising at least a first optical feature, the first optical feature being positioned such that at least some of the first solid state emitter light which enters into the second optical device structure will exit the third optical device structure from the third structure second surface.

In some embodiments according to the present inventive subject matter, the lighting device further comprises at least a first luminescent material, the first luminescent material being positioned such that if the first solid state light emitter is illuminated so as to emit first solid state emitter light, and at least a portion of the first luminescent material is excited so as to emit first luminescent material emitted light, at least a portion of the first solid state emitter light and at least a portion of the first luminescent material emitted light will mix.

In some embodiments according to the present inventive subject matter, the lighting device further comprises at least a first luminescent material, the first luminescent material being positioned such that if the first solid state light emitter is illuminated so as to emit first solid state emitter light, at least a portion of the first solid state emitter light will contact at least a portion of the first luminescent material.

In some embodiments according to the present inventive subject matter, the lighting device further comprises at least a first luminescent material, the first solid state light emitter being embedded within an encapsulant element in which at least a portion of the luminescent material is also embedded.

In some embodiments according to the present inventive subject matter, the lighting device further comprises at least a second solid state light emitter, the second solid state light emitter being positioned and oriented such that if the second solid state light emitter is illuminated so as to emit second solid state emitter light, at least a portion of the second solid state emitter light will enter into the second optical device structure, and at least some of the portion of the second solid state emitter light will exit the lighting device from the third structure second surface.

In some embodiments according to the present inventive subject matter, the second optical device structure first index of refraction and the second optical device structure second index of refraction are substantially equal.

In some embodiments according to the present inventive subject matter, the first optical device structure has a substantially uniform index of refraction, the second optical device structure has a substantially uniform index of refraction, and the third optical device structure has a substantially uniform index of refraction.

In some embodiments according to the present inventive subject matter, the first solid state light emitter is embedded in the second optical device structure, in some cases in an edge region of the second optical device structure, the edge region being located between the second structure first surface and the second structure second surface.

In some embodiments according to the present inventive subject matter, the second optical device structure comprises at least a first cavity, and the first solid state light emitter is positioned within the first cavity. In some such embodiments, the first cavity is formed in an edge region of the second optical device structure, the edge region being located between the second structure first surface and the second structure second surface.

In some embodiments according to the present inventive subject matter, the lighting device further comprises at least a first reflector, the first reflector being positioned such that if any light exits the first optical device structure from the first structure first surface, at least a portion of the light which exits the first optical device structure from the first structure first surface will be reflected by the reflector and will re-enter the first optical device structure through the first structure first surface. In some such embodiments, the reflector is positioned and oriented relative to the first optical device such that a center of the first structure first surface, a center of the third structure second surface and a center of the reflector are substantially aligned.

In some embodiments according to the present inventive subject matter, the lighting device further comprises a rim portion, the rim portion being positioned such that the rim portion blocks the first solid state light emitter from view from a vantage point along a line segment spaced from and perpendicular to the third structure second surface and extending from the third structure second surface and away from the third structure first surface. In some such embodiments, the rim portion extends around an entire periphery of the third structure second surface.

In some embodiments according to the present inventive subject matter, the lighting device further comprises at least a first power line, at least a second solid state light emitter and at least a first luminescent material region comprising a first luminescent material, the second solid state light emitter being positioned and oriented such that if the second solid state light emitter is illuminated so as to emit second solid state emitter light, at least a portion of the second solid state emitter light will enter into the second optical device structure, and at least some of the portion of the second solid state emitter light will exit the lighting device from the third structure second surface, wherein:
the first solid state light emitter, if illuminated, would emit light having a peak wavelength in the range of from 430 nm to 480 nm;
the first luminescent material, if excited, would emit light having a dominant wavelength in the range of from about 555 nm to about 585 nm;
the second solid state light emitter, if illuminated, would emit light having a dominant wavelength in the range of from 600 nm to 630 nm. In some such embodiments, if power is supplied to each power line in the lighting device:

a mixture of light emitted by each solid state light emitter in the lighting device which, if illuminated, would emit light having a peak wavelength in the range of from 430 nm to 480 nm, each luminescent material region in the lighting device which, if excited, would emit light having a dominant wavelength in the range of from 555 nm to 585 nm, and each solid state light emitter in the lighting device which, if illuminated, would emit light having a dominant wavelength in the range of from 600 nm to 630 nm would, in an absence of any additional light, produce a mixed illumination having x, y coordinates on a 1931 CIE Chromaticity Diagram which define a point which is within ten MacAdam ellipses of at least one point on the blackbody locus on a 1931 CIE Chromaticity Diagram, and a sub-mixture of light emitted by each solid state light emitter in the lighting device which, if illuminated, would emit light having a peak wavelength in the range of from 430 nm to 480 nm, and each luminescent material region in the lighting device which, if excited, would emit light having a dominant wavelength in the range of from 555 nm to 585 nm would, in an absence of any additional light, produce a sub-mixture illumination having x, y color coordinates which define a point which is within an area on a 1931 CIE Chromaticity Diagram enclosed by first, second, third, fourth and fifth line segments, the first line segment connecting a first point to a second point, the second line segment connecting the second point to a third point, the third line segment connecting the third point to a fourth point, the fourth line segment connecting the fourth point to a fifth point, and the fifth line segment connecting the fifth point to the first point, the first point having x, y coordinates of 0.32, 0.40, the second point having x, y coordinates of 0.36, 0.48, the third point having x, y coordinates of 0.43, 0.45, the fourth point having x, y coordinates of 0.42, 0.42, and the fifth point having x, y coordinates of 0.36, 0.38.

In some such embodiments, the sub-mixture illumination has x, y color coordinates which define a point which is within an area on a 1931 CIE Chromaticity Diagram enclosed by first, second, third and fourth line segments, the first line segment connecting a first point to a second point, the second line segment connecting the second point to a third point, the third line segment connecting the third point to a fourth point, the fourth line segment connecting the fourth point to the first point, the first point having x, y coordinates of 0.32, 0.40, the second point having x, y coordinates of 0.36, 0.48, the third point having x, y coordinates of 0.41, 0.455, and the fourth point having x, y coordinates of 0.36, 0.38.

According to a third aspect of the present inventive subject matter, there is provided a lighting device which comprises the elements as discussed above in connection with the first aspect of the present inventive subject matter, and which further comprises at least a second solid state light emitter and at least a second optical device, the second optical device comprising at least a fourth optical device structure, a fifth optical device structure and a sixth optical device structure, the fourth optical device structure comprising a fourth structure first surface and a fourth structure second surface, the fifth optical device structure comprising a fifth structure first surface and a fifth structure second surface, the sixth optical device structure comprising a sixth structure first surface and a sixth structure second surface, the fourth structure second surface being in contact with the fifth structure first surface, the fifth structure second surface being in contact with the sixth structure first surface, a first region of the fourth optical device structure comprising the fourth structure second surface, a first region of the fifth optical device structure comprising the fifth structure first surface, a second region of the fifth optical device structure comprising the fifth structure second surface, a first region of the sixth optical device structure comprising the sixth structure first surface, the first region of the fourth optical device structure having a fourth optical device structure first index of refraction, the first region of the fifth optical device structure having a fifth optical device structure first index of refraction, the second region of the fifth optical device structure having a fifth optical device structure second index of refraction, the first region of the sixth optical device structure having a sixth optical device structure first index of refraction, the fifth optical device structure first index of refraction being greater than the fourth optical device structure first index of refraction, the fifth optical device structure second index of refraction being greater than the sixth optical device structure first index of refraction, the second solid state light emitter being positioned and oriented such that if the second solid state light emitter is illuminated so as to emit second solid state emitter light, at least a portion of the second solid state emitter light will enter into the fifth optical device structure, the sixth optical device structure comprising at least a second optical feature, the second optical feature being positioned such that if the second solid state light emitter is illuminated so as to emit second solid state emitter light, whereby at least a portion of the second solid state emitter light will enter into the fifth optical device structure, at least some of the portion of the second solid state emitter light will exit the lighting device from the sixth structure second surface.

In some embodiments according to the third aspect of the present inventive subject matter, the second optical device is positioned and oriented relative to the first optical device such that if the first solid state light emitter is illuminated, whereby at least some of the portion of the first solid state emitter light will exit the third optical device structure from the third structure second surface, at least a portion of the first solid state emitter light which exits from the third structure second surface will exit the sixth structure from the sixth structure second surface.

In some embodiments according to the third aspect of the present inventive subject matter, the second optical device is positioned and oriented relative to the first optical device such that a center of the first structure first surface, a center of the third structure second surface and a center of the sixth structure second surface are substantially aligned.

In some embodiments according to the third aspect of the present inventive subject matter, the lighting device further comprises at least a first luminescent material-containing region and a second luminescent material-containing region, the first luminescent material-containing region being positioned such that if the first solid state light emitter is illuminated so as to emit first solid state emitter light, and at least a portion of the first luminescent material is excited so as to emit first luminescent material emitted light, at least a portion of the first solid state emitter light and at least a portion of the first luminescent material emitted light will mix, the second luminescent material-containing region being positioned such that if the second solid state light emitter is illuminated so as to emit second solid state emitter light, and at least a portion of the second luminescent material is excited so as to emit second luminescent material emitted light, at least a portion of the second solid state emitter light and at least a portion of the second luminescent material emitted light will mix.

In some embodiments according to the third aspect of the present inventive subject matter, the lighting device further comprises at least a first luminescent material-containing region and a second luminescent material-containing region, the first luminescent material-containing region being positioned such that if the first solid state light emitter is illuminated so as to emit first solid state emitter light, at least a portion of the first solid state emitter light will enter into the first luminescent material-containing region, the second luminescent material-containing region being positioned such that if the second solid state light emitter is illuminated so as to emit second solid state emitter light, at least a portion of the second solid state emitter light will enter into the second luminescent material-containing region.

In some embodiments according to the third aspect of the present inventive subject matter, the lighting device further comprises a rim portion, the rim portion being positioned such that the rim portion blocks the first solid state light emitter and the second solid state light emitter from view from a vantage point along a line segment spaced from and perpendicular to the sixth structure second surface and extending from the sixth structure second surface and away from the sixth structure first surface. In some such embodiments, the rim portion extends around an entire periphery of the sixth structure second surface.

In some embodiments according to the third aspect of the present inventive subject matter, the lighting device further comprises at least a first reflector, the first reflector being positioned such that if any light exits the first optical device structure from the first structure first surface, at least a portion of the light which exits the first optical device structure from the first structure first surface will be reflected by the reflector and will re-enter the first optical device structure through the first structure first surface.

According to a fourth aspect of the present inventive subject matter, there is provided an illuminated enclosure (the volume of which can be illuminated uniformly or non-uniformly), comprising an enclosed space and at least one lighting device according to the present inventive subject matter, wherein the lighting device illuminates at least a portion of the enclosure (uniformly or non-uniformly).

According to a fifth aspect of the present inventive subject matter, there is provided an illuminated surface, comprising a surface and at least one lighting device as described above, wherein if the lighting device is illuminated, the lighting device would illuminate at least a portion of the surface.

According to a sixth aspect of the present inventive subject matter, there is provided an illuminated area, comprising at least one item, e.g., selected from among the group consisting of a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, etc., having mounted therein or thereon at least one lighting device as described herein.

The inventive subject matter may be more fully understood with reference to the accompanying drawings and the following detailed description of the inventive subject matter.

DETAILED DESCRIPTION OF THE INVENTION(S)

The present inventive subject matter now will be described more fully hereinafter with reference to the accompanying drawings, in which embodiments of the inventive subject matter are shown. However, this inventive subject matter should not be construed as limited to the embodiments set forth herein. Rather, these embodiments are provided so that this disclosure will be thorough and complete, and will fully convey the scope of the inventive subject matter to those skilled in the art. Like numbers refer to like elements throughout. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

When an element such as a layer, region or substrate is referred to herein as being "on" or extending "onto" another element, it can be directly on or extend directly onto the other element or intervening elements may also be present. In contrast, when an element is referred to herein as being "directly on" or extending "directly onto" another element, there are no intervening elements present.

Although the terms "first", "second", etc. may be used herein to describe various elements, components, regions, layers, sections and/or parameters, these elements, components, regions, layers, sections and/or parameters should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive subject matter.

Furthermore, relative terms, such as "lower" or "bottom" and "upper" or "top," may be used herein to describe one element's relationship to another elements as illustrated in the Figures. Such relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompass both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

The expression "illumination" (or "illuminated"), as used herein when referring to a solid state light emitter, means that at least some current is being supplied to the solid state light emitter to cause the solid state light emitter to emit at least some light. The expression "illuminated" encompasses situations where the solid state light emitter emits light continuously or intermittently at a rate such that a human eye would perceive it as emitting light continuously, or where a plurality of solid state light emitters of the same color or different colors are emitting light intermittently and/or alternatingly (with or without overlap in "on" times) in such a way that a human eye would perceive them as emitting light continuously (and, in cases where different colors are emitted, as a mixture of those colors).

The expression "excited", as used herein when referring to a lumiphor, means that at least some electromagnetic radiation (e.g., visible light, UV light or infrared light) is contacting the lumiphor, causing the lumiphor to emit at least some light. The expression "excited" encompasses situations where the lumiphor emits light continuously or intermittently at a rate such that a human eye would perceive it as emitting light continuously, or where a plurality of lumiphors of the same color or different colors are emitting light intermittently and/or alternatingly (with or without overlap in "on" times) in such a way that a human eye would perceive them as emitting light continuously (and, in cases where different colors are emitted, as a mixture of those colors).

With regard to any mixed light described herein in terms of its proximity (in MacAdam ellipses) to the blackbody locus on a 1931 CIE Chromaticity Diagram, the present inventive subject matter is further directed to such mixed light in the proximity of light on the blackbody locus having color temperature of 2700 K, 3000 K or 3500 K, namely:

mixed light having x, y color coordinates which define a point which is within an area on a 1931 CIE Chromaticity Diagram enclosed by first, second, third, fourth and fifth line segments, the first line segment connecting a first point to a second point, the second line segment connecting the second point to a third point, the third line segment connecting the third point to a fourth point, the fourth line segment connecting the fourth point to a fifth point, and the fifth line segment connecting the fifth point to the first point, the first point having x, y coordinates of 0.4578, 0.4101, the second point having x, y coordinates of 0.4813, 0.4319, the third point having x, y coordinates of 0.4562, 0.4260, the fourth point having x, y coordinates of 0.4373, 0.3893, and the fifth point having x, y coordinates of 0.4593, 0.3944 (i.e., proximate to 2700 K); or mixed light having x, y color coordinates which define a point which is within an area on a 1931 CIE Chromaticity Diagram enclosed by first, second, third, fourth and fifth line segments, the first line segment connecting a first point to a second point, the second line segment connecting the second point to a third point, the third line segment connecting the third point to a fourth point, the fourth line segment connecting the fourth point to a fifth point, and the fifth line segment connecting the fifth point to the first point, the first point having x, y coordinates of 0.4338, 0.4030, the second point having x, y coordinates of 0.4562, 0.4260, the third point having x, y coordinates of 0.4299, 0.4165, the fourth point having x, y coordinates of 0.4147, 0.3814, and the fifth point having x, y coordinates of 0.4373, 0.3893 (i.e., proximate to 3000 K); or mixed light having x, y color coordinates which define a point which is within an area on a 1931 CIE Chromaticity Diagram enclosed by first, second, third, fourth and fifth line segments, the first line segment connecting a first point to a second point, the second line segment connecting the second point to a third point, the third line segment connecting the third point to a fourth point, the fourth line segment connecting the fourth point to a fifth point, and the fifth line segment connecting the fifth point to the first point, the first point having x, y coordinates of 0.4073, 0.3930, the second point having x, y coordinates of 0.4299, 0.4165, the third point having x, y coordinates of 0.3996, 0.4015, the fourth point having x, y coordinates of 0.3889, 0.3690, and the fifth point having x, y coordinates of 0.4147, 0.3814 (i.e., proximate to 3500 K).

A statement herein that two components in a device are "electrically connected," means that there are no components electrically between the components, the insertion of which materially affect the function or functions provided by the device. For example, two components can be referred to as being electrically connected, even though they may have a small resistor between them which does not materially affect the function or functions provided by the device (indeed, a wire connecting two components can be thought of as a small resistor); likewise, two components can be referred to as being electrically connected, even though they may have an additional electrical component between them which allows the device to perform an additional function, while not materially affecting the function or functions provided by a device which is identical except for not including the additional component; similarly, two components which are directly connected to each other, or which are directly connected to opposite ends of a wire or a trace on a circuit board or another medium, are electrically connected.

The expression "lighting device", as used herein, is not limited, except that it indicates that the device is capable of emitting light. That is, a lighting device can be a device which illuminates an area or volume, e.g., a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, or a device or array of devices that illuminate an enclosure, or a device that is used for edge or back-lighting (e.g., back light poster, signage, LCD displays), bulb replacements (e.g., for replacing AC incandescent lights, low voltage lights, fluorescent lights, etc.), lights used for outdoor lighting, lights used for security lighting, lights used for exterior residential lighting (wall mounts, post/column mounts), ceiling fixtures/wall sconces, under cabinet lighting, lamps (floor and/or table and/or desk), landscape lighting, track lighting, task lighting, specialty lighting, ceiling fan lighting, archival/art display lighting, high vibration/impact lighting—work lights, etc., mirrors/vanity lighting, or any other light emitting device.

As used herein, the term "substantially," e.g., in the expressions "substantially equal", "substantially uniform", "substantially aligned", "substantially parallel", "substantially planar", "substantially circular", "substantially square", etc., means at least about 95% correspondence with the feature recited, e.g., "substantially equal" means that the respective values differ by not more than 5%; "substantially uniform" means that 95% of the structure have values which differ from an average value by not more than 5%; "substantially aligned" means that a line connecting any pair of points and a line connecting any other pair of points define an angle not greater than 5% of 90 degrees, i.e., 4.5 degrees; "substantially parallel" means that two planes diverge from each other at most by an angle of 5% of 90 degrees, i.e., 4.5 degrees; "substantially flat" means that at least 95% of the points in the surface which is characterized as being substantially flat are located on one of or between a pair of planes which are parallel and which are spaced from each other by a distance of not more than 5% of the largest dimension of the surface; "substantially circular" means that a circle can be drawn having the formula $x^2+y^2=1$, where imaginary axes can be drawn at a location where the y coordinate of each point on the structure is within 0.95 to 1.05 times the value obtained by inserting the x coordinate of such point into such formula; and "substantially square" means that the shape can be placed on x,y coordinates such that and each point on the shape has an x coordinate or a y coordinate which is within 0.95 to 1.05 times a particular value or the negative of that value, and the absolute value of neither the x coordinate nor the y coordinate exceeds the absolute value of 1.05 times such particular value.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

As noted above, according to a first aspect of the present inventive subject matter, there is provided a lighting device, comprising at least one solid state light emitter and at least one optical device.

Any desired solid state light emitter or emitters can be employed in accordance with the present inventive subject matter. Persons of skill in the art are aware of, and have ready access to, a wide variety of such emitters. Such solid state light emitters include inorganic and organic light emitters. Examples of types of such light emitters include a wide variety of light emitting diodes (inorganic or organic, including polymer light emitting diodes (PLEDs)), laser diodes, thin film electroluminescent devices, light emitting polymers (LEPs), a variety of each of which are well-known in the art (and therefore it is not necessary to describe in detail such devices, and/or the materials out of which such devices are made). In some embodiments according to the present inventive subject matter, a lighting device includes one or more solid state light emitters and at least one luminescent material, in which at least a portion of the light emitted by the luminescent element is emitted in response to luminescent material being excited by light emitted by one or more of the at least one solid state light emitter.

Where a lighting device includes more than one solid state light emitters, all of the solid state light emitters can be similar, or respective groups of one or more of the respective light emitters can be different from each other in any of a variety of ways (i.e., type of solid state light emitter, chemical makeup of the solid state light emitter, dominant wavelength and/or peak wavelength of emitted light, size, etc.).

Representative examples of such LEDs, many of which are known in the art, can include lead frames, lumiphors, encapsulant regions, etc.

Representative examples of suitable LEDs are described in:

(1) U.S. Patent Application No. 60/753,138, filed on Dec. 22, 2005, entitled "Lighting Device" (inventor: Gerald H. Negley; and U.S. patent application Ser. No. 11/614,180, filed Dec. 21, 2006 (now U.S. Patent Publication Ser. No. 2007/0236911), the entireties of which are hereby incorporated by reference;

(2) U.S. Patent Application No. 60/794,379, filed on Apr. 24, 2006, entitled "Shifting Spectral Content in LEDs by Spatially Separating Lumiphor Films" (inventors: Gerald H. Negley and Antony Paul van de Ven; and U.S. patent application Ser. No. 11/624,811, filed Jan. 19, 2007 (now U.S. Patent Publication Ser. No. 2007/0170447), the entireties of which are hereby incorporated by reference;

(3) U.S. Patent Application No. 60/808,702, filed on May 26, 2006, entitled "Lighting Device" (inventors: Gerald H. Negley and Antony Paul van de Ven; and U.S. patent application Ser. No. 11/751,982, filed May 22, 2007 (now U.S. Patent Publication Ser. No. 2007/0274080), the entireties of which are hereby incorporated by reference;

(4) U.S. Patent Application No. 60/808,925, filed on May 26, 2006, entitled "Solid State Light Emitting Device and Method of Making Same" (inventors: Gerald H. Negley and Neal Hunter; and U.S. patent application Ser. No. 11/753,103, filed May 24, 2007 (now U.S. Patent Publication Ser. No. 2007/280624), the entireties of which are hereby incorporated by reference;

(5) U.S. Patent Application No. 60/802,697, filed on May 23, 2006, entitled "Lighting Device and Method of Making" (inventor: Gerald H. Negley; and U.S. patent application Ser. No. 11/751,990 (now U.S. Patent Publication Ser. No. 2007/0274063), filed May 22, 2007, the entireties of which are hereby incorporated by reference;

(6) U.S. Patent Application No. 60/839,453, filed on Aug. 23, 2006, entitled "LIGHTING DEVICE AND LIGHTING METHOD" (inventors: Antony Paul van de Ven and Gerald H. Negley; and U.S. patent application Ser. No. 11/843,243, filed Aug. 22, 2007 (now U.S. Patent Publication Ser. No. 2008/0084685), the entireties of which are hereby incorporated by reference;

(7) U.S. Patent Application No. 60/857,305, filed on Nov. 7, 2006, entitled "LIGHTING DEVICE AND LIGHTING METHOD" (inventors: Antony Paul van de Ven and Gerald H. Negley), the entirety of which is hereby incorporated by reference;

(8) U.S. Patent Application No. 60/851,230, filed on Oct. 12, 2006, entitled "LIGHTING DEVICE AND METHOD OF MAKING SAME" (inventor: Gerald H. Negley), the entirety of which is hereby incorporated by reference.

The lighting devices according to the present inventive subject matter can comprise any desired number of solid state emitters. For example, a lighting device according to the present inventive subject matter can include 50 or more light emitting diodes, or can include 100 or more light emitting diodes, etc.

The solid state light emitters can emit light of any desired wavelength or wavelengths (or wavelength range or wavelength ranges) within the ranges of infrared, visible and ultraviolet light, including, e.g., (1) two or more light emitting diodes emitting light within different wavelength ranges within the visible spectrum, (2) two or more light emitting diodes emitting light within different wavelength ranges within the infrared spectrum, (3) two or more light emitting diodes emitting light within different wavelength ranges within the ultraviolet spectrum, (4) one or more light emitting diodes emitting light within the visible spectrum and one or more light emitting diodes emitting light within the infrared spectrum, (5) one or more light emitting diodes emitting light within the visible spectrum and one or more light emitting diodes emitting light within the ultraviolet spectrum, etc.

In some embodiments of the inventive subject matter, the one or more solid state light emitters is/are positioned such that at least 10% (in some embodiments at least 20%, in some embodiments, at least 40%, and in some embodiments at least 60% or more) of the light emitted by such solid state light emitter(s) enter a second optical device structure.

Any desired optical device or optical devices can be employed in accordance with the present inventive subject matter. Persons of skill in the art are aware of, and have ready access to, a wide variety of such optical devices.

Representative examples of such optical devices include transparent or translucent materials shaped in a way that will enable light to be collected, directed and/or projected in the manner desired. Skilled artisans are familiar with a variety of shaping techniques to collect, direct and/or project light.

As noted above, the third optical device structure of each of the one or more optical devices comprises at least a first optical feature, the first optical feature being positioned such that if the first solid state light emitter is illuminated, at least some of the portion of the first solid state emitter light will exit the third optical device structure from the third structure second surface. Persons skilled in the art are familiar with, have access to, and can readily manufacture optical devices having such optical features which allow for light to escape from the optical device at one or more particular desired locations.

In some embodiments of the present inventive subject matter, the optical device in the lighting device, or one or more of the optical devices in the lighting device is substantially disc-shaped. The expression "disc-shaped", as used herein, generally means a shape which has two major surfaces and one or more edge surfaces located between the two major surfaces. In some instances, the major surfaces are substantially flat, and/or substantially parallel to each other, and/or the overall "disc-shaped" structure has a plane of substantial symmetry. Such disc-shaped structures can have one or two major surfaces which are of any desired shape, e.g., substantially circular (i.e., the structure is substantially circular disc-shaped), substantially square (i.e., the structure is substantially square disc-shaped), etc.

In some embodiments of the present inventive subject matter, the lighting device can be mounted such that the optical device in the lighting device, or one or more of the optical devices in the lighting device, extend away from a construction material (e.g., extend down from a ceiling in a room, office, warehouse, etc.), thereby providing enhanced heat dissipation capabilities.

As noted above, in some embodiments according to the present inventive subject matter, the lighting device further comprises at least a first luminescent material. A wide variety of luminescent materials (also known as lumiphors or luminophoric media, e.g., as disclosed in U.S. Pat. No. 6,600,175, the entirety of which is hereby incorporated by reference) are well-known and available to persons of skill in the art. For example, a phosphor is a luminescent material that emits a responsive radiation (e.g., visible light) when excited by a source of exciting radiation. In many instances, the responsive radiation has a wavelength which is different from the wavelength of the exciting radiation. Other examples of luminescent materials include scintillators, day glow tapes and inks which glow in the visible spectrum upon illumination with ultraviolet light.

Luminescent materials can be categorized as being down-converting, i.e., a material which converts photons to a lower energy level (longer wavelength) or up-converting, i.e., a material which converts photons to a higher energy level (shorter wavelength).

Inclusion of luminescent materials in LED devices has been accomplished in a variety of ways, one representative way being by adding the luminescent materials to a clear encapsulant material (e.g., epoxy-based, silicone-based, glass-based or metal oxide-based material), for example by a blending or coating process.

For example, one representative example of a conventional light emitting diode lamp includes a light emitting diode chip, a bullet-shaped transparent housing to cover the light emitting diode chip, leads to supply current to the light emitting diode chip, and a cup reflector for reflecting the emission of the light emitting diode chip in a uniform direction, in which the light emitting diode chip is encapsulated with a first resin portion, which is further encapsulated with a second resin portion. The first resin portion can be obtained by filling the cup reflector with a resin material and curing it after the light emitting diode chip has been mounted onto the bottom of the cup reflector and then has had its cathode and anode electrodes electrically connected to the leads by way of wires. A luminescent material can be dispersed in the first resin portion so as to be excited with the light A that has been emitted from the light emitting diode chip, the excited luminescent material produces fluorescence ("light B") that has a longer wavelength than the light A, a portion of the light A is transmitted through the first resin portion including the luminescent material, and as a result, light C, as a mixture of the light A and light B, is used as illumination.

For example, lumiphors which may be used in practicing the present inventive subject matter are described in the patent applications incorporated by reference above and noted as disclosing LEDs which are suitable for use in the present inventive subject matter.

As noted above, in some embodiments according to the present inventive subject matter, the lighting device further comprises at least a first reflector. Any suitable reflective material can be used to make the reflector, and the reflector can be any desired size and shape.

A representative example of a suitable material out of which the reflector can be made is a material marketed by Furukawa (a Japanese corporation) under the trademark MCPET®.

As noted above, in some embodiments according to the present inventive subject matter, the lighting device further comprises a rim portion. Any suitable material can be used to make the rim portion, and the rim portion can be any desired size and shape (so long as the rim portion can be positioned such that it blocks at least one solid state light emitter from view from a vantage point along a line segment spaced from and perpendicular to the third structure second surface and extending from the third structure second surface and away from the third structure first surface.

The lighting devices of the present inventive subject matter can be arranged, mounted and supplied with electricity in any desired manner, and can be mounted on any desired housing or fixture. Skilled artisans are familiar with a wide variety of arrangements, mounting schemes, power supplying apparatuses, housings and fixtures, and any such arrangements, schemes, apparatuses, housings and fixtures can be employed in connection with the present inventive subject matter. The lighting devices of the present inventive subject matter can be electrically connected (or selectively connected) to any desired power source, persons of skill in the art being familiar with a variety of such power sources.

As noted above, in some embodiments according to the present inventive subject matter, the lighting device further comprises at least a first power line. Any desired power line structure(s) can be employed in accordance with the present inventive subject matter, and persons of skill in the art are aware of, and have ready access to, a wide variety of such structures.

Circuitry which may be used in practicing the present inventive subject matter is described in:

(1) U.S. Patent Application No. 60/752,753, filed on Dec. 21, 2005, entitled "Lighting Device" (inventors: Gerald H. Negley, Antony Paul van de Ven and Neal Hunter; and U.S. patent application Ser. No. 11/613,692, filed Dec. 20, 2006 (now U.S. Patent Publication Ser. No. 2007/0139923), the entireties of which are hereby incorporated by reference;

(2) U.S. Patent Application No. 60/798,446, filed on May 5, 2006, entitled "Lighting Device" (inventor: Antony Paul van de Ven; and U.S. patent application Ser. No. 11/743,754, filed May 3, 2007 (now U.S. Patent Publication Ser. No. 2007/0263393), the entireties of which are hereby incorporated by reference;

(3) U.S. Patent Application No. 60/809,959, filed on Jun. 1, 2006, entitled "Lighting Device With Cooling" (inventors: Thomas G. Coleman, Gerald H. Negley and Antony Paul van de Ven and U.S. patent application Ser. No. 11/626,483, filed Jan. 24, 2007 (now U.S. Patent Publication Ser. No. 2007/0171145), the entireties of which are hereby incorporated by reference;

(4) U.S. Patent Application No. 60/809,595, filed on May 31, 2006, entitled "LIGHTING DEVICE AND METHOD OF LIGHTING" (inventor: Gerald H. Negley; and U.S. patent application Ser. No. 11/755,162, filed May 30, 2007 (now U.S. Patent Publication Ser. No. 2007/0279440), the entireties of which are hereby incorporated by reference; and (5) U.S. Patent Application No. 60/844,325, filed on Sep. 13, 2006, entitled "BOOST/FLYBACK POWER SUPPLY TOPOLOGY WITH LOW SIDE MOSFET CURRENT CONTROL" (inventor: Peter Jay Myers; and U.S. patent application Ser. No. 11/854,744, filed Sep. 13, 2007 (now U.S. Patent Publication Ser. No. 2008/0088248), the entireties of which are hereby incorporated by reference.

According to a second aspect of the present inventive subject matter, there is provided a method of lighting, comprising illuminating at least a first solid state light emitter of a lighting device according to the first aspect of the present inventive subject matter.

As noted above, according to a third aspect of the present inventive subject matter, there is provided a lighting device which comprises the elements as discussed above in connection with the first aspect of the present inventive subject matter, and which further comprises at least a second solid state light emitter and at least a second optical device.

In some embodiments of the third aspect of the present inventive subject matter, two or more optical devices, each having at least one solid state light emitter, can be stacked. In such an arrangement, light exiting from the third structure second surface of a first optical device passes through any other optical device or devices positioned opposite the third structure of the first optical device relative to the second structure of the first optical device. For example, in a device which includes three stacked optical devices, the device being mounted to a ceiling with the first optical device closest to the ceiling, the second optical device below the first optical device and the third optical device below the second optical device, (1) light from the first optical device exits from the third structure second surface of the first optical device and passes downward through the second optical device and the third optical device; (2) light from the second optical device exits from the third structure second surface of the second optical device and passes downward through the third optical device; and (3) light from the third optical device exits from the third structure second surface of the third optical device.

In general, light of any number of colors can be mixed by the lighting devices according to the present inventive subject matter. Representative examples of blends of light colors are described in:

(1) U.S. Patent Application No. 60/752,555, filed Dec. 21, 2005, entitled "Lighting Device and Lighting Method" (inventors: Antony Paul Van de Ven and Gerald H. Negley; and U.S. patent application Ser. No. 11/613,714, filed Dec. 20, 2006 (now U.S. Patent Publication Ser. No. 2007/0139920), the entireties of which are hereby incorporated by reference;

(2) U.S. Patent Application No. 60/752,556, filed on Dec. 21, 2005, entitled "SIGN AND METHOD FOR LIGHTING" (inventors: Gerald H. Negley and Antony Paul van de Ven; and U.S. patent application Ser. No. 11/613,733, filed Dec. 20, 2006 (now U.S. Patent Publication Ser. No. 2007/0137074), the entireties of which are hereby incorporated by reference;

(3) U.S. Patent Application No. 60/793,524, filed on Apr. 20, 2006, entitled "LIGHTING DEVICE AND LIGHTING METHOD" (inventors: Gerald H. Negley and Antony Paul van de Ven; and U.S. patent application Ser. No. 11/736,761, filed Apr. 18, 2007 (now U.S. Patent Publication Ser. No. 2007/0278934), the entireties of which are hereby incorporated by reference;

(4) U.S. Patent Application No. 60/793,518, filed on Apr. 20, 2006 (now U.S. Patent Publication Ser. No. 2007/0267983), entitled "LIGHTING DEVICE AND LIGHTING METHOD" (inventors: Gerald H. Negley and Antony Paul van de Ven; and U.S. patent application Ser. No. 11/736,799, filed Apr. 18, 2007, the entireties of which are hereby incorporated by reference;

(5) U.S. Patent Application No. 60/793,530, filed on Apr. 20, 2006 (now U.S. Patent Publication Ser. No. 2007/0278503), entitled "LIGHTING DEVICE AND LIGHTING METHOD" (inventors: Gerald H. Negley and Antony Paul van de Ven; and U.S. patent application Ser. No. 11/737,321, filed Apr. 19, 2007, the entireties of which are hereby incorporated by reference;

(6) U.S. Pat. No. 7,213,940, issued on May 8, 2007, entitled "LIGHTING DEVICE AND LIGHTING METHOD" (inventors: Antony Paul van de Ven and Gerald H. Negley), the entirety of which is hereby incorporated by reference;

(7) U.S. Patent Application No. 60/868,134, filed on Dec. 1, 2006, entitled "LIGHTING DEVICE AND LIGHTING METHOD" (inventors: Antony Paul van de Ven and Gerald H. Negley), the entirety of which is hereby incorporated by reference;

(8) U.S. Patent Application No. 60/868,986, filed on Dec. 7, 2006, entitled "LIGHTING DEVICE AND LIGHTING METHOD" (inventors: Antony Paul van de Ven and Gerald H. Negley), the entirety of which is hereby incorporated by reference;

(9) U.S. Patent Application No. 60/857,305, filed on Nov. 7, 2006, entitled "LIGHTING DEVICE AND LIGHTING METHOD" (inventors: Antony Paul van de Ven and Gerald H. Negley), the entirety of which is hereby incorporated by reference; and (10) U.S. Patent Application No. 60/891,148, filed on Feb. 22, 2007, entitled "LIGHTING DEVICE AND METHODS OF LIGHTING, LIGHT FILTERS AND METHODS OF FILTERING LIGHT" (inventor: Antony Paul van de Ven), the entirety of which is hereby incorporated by reference.

One or more brightness enhancement films can optionally further be included in the lighting devices according to this aspect of the present inventive subject matter. Such films are well-known in the art and are readily available. Brightness enhancement films (e.g., BEF films commercially available from 3M) are optional—when employed, they provide a more directional light source by limiting the acceptance angle. Light not "accepted" is recycled by the highly reflective light source enclosure. Preferably, the brightness enhancement films (which can optionally be replaced by one or more extraction films, such as by WFT), if employed, are optimized to limit the viewing angle of the emitted source and to increase the probability of extracting light on the first (or earliest possible) pass.

In addition, one or more scattering elements (e.g., layers) can optionally be included in the lighting devices according to this aspect of the present inventive subject matter. The scattering element can be included in a lumiphor, and/or a separate scattering element can be provided. A wide variety of separate scattering elements and combined luminescent and scattering elements are well known to those of skill in the art, and any such elements can be employed in the lighting devices of the present inventive subject matter.

The devices according to the present inventive subject matter can further comprise secondary optics to further change the projected nature of the emitted light. Such secondary optics are well-known to those skilled in the art, and so they do not need to be described in detail herein—any such secondary optics can, if desired, be employed.

The devices according to the present inventive subject matter can further comprise sensors or charging devices or cameras, etc. For example, persons of skill in the art are familiar with, and have ready access to, devices which detect one or more occurrence (e.g., motion detectors, which detect motion of an object or person), and which, in response to such detection, trigger illumination of a light, activation of a security camera, etc. As a representative example, a device according to the present inventive subject matter can include a lighting device according to the present inventive subject matter and a motion sensor, and can be constructed such that (1) while the light is illuminated, if the motion sensor detects movement, a security camera is activated to record visual data at or around the location of the detected motion, or (2) if the motion sensor detects movement, the light is illuminated to light the region near the location of the detected motion and the security camera is activated to record visual data at or around the location of the detected motion, etc.

Embodiments in accordance with the present inventive subject matter are described herein with reference to cross-sectional (and/or plan view) illustrations that are schematic illustrations of idealized embodiments of the present inventive subject matter. As such, variations from the shapes of the illustrations as a result, for example, of manufacturing techniques and/or tolerances, are to be expected. Thus, embodiments of the present inventive subject matter should not be construed as limited to the particular shapes of regions illustrated herein but are to include deviations in shapes that result, for example, from manufacturing. For example, a molded region illustrated or described as a rectangle will, typically, have rounded or curved features. Thus, the regions illustrated in the figures are schematic in nature and their shapes are not intended to illustrate the precise shape of a region of a device and are not intended to limit the scope of the present inventive subject matter.

Figure 1:
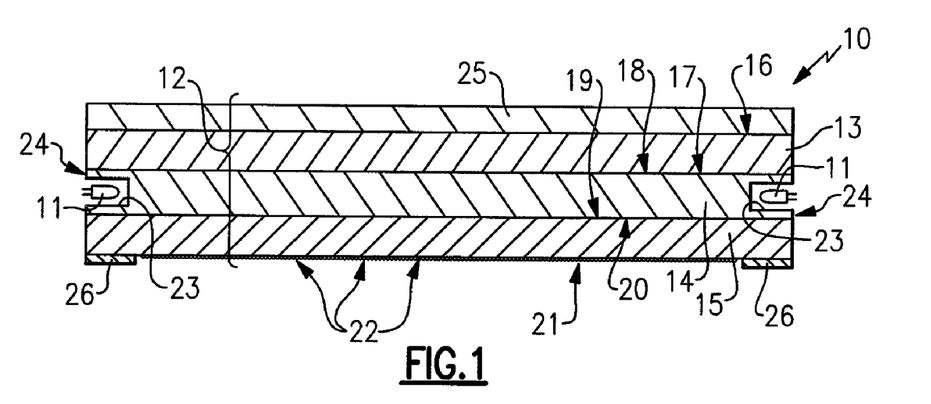
FIG. 1 is a sectional view of a first embodiment of a lighting device according to the present inventive subject matter.
Figure 2:
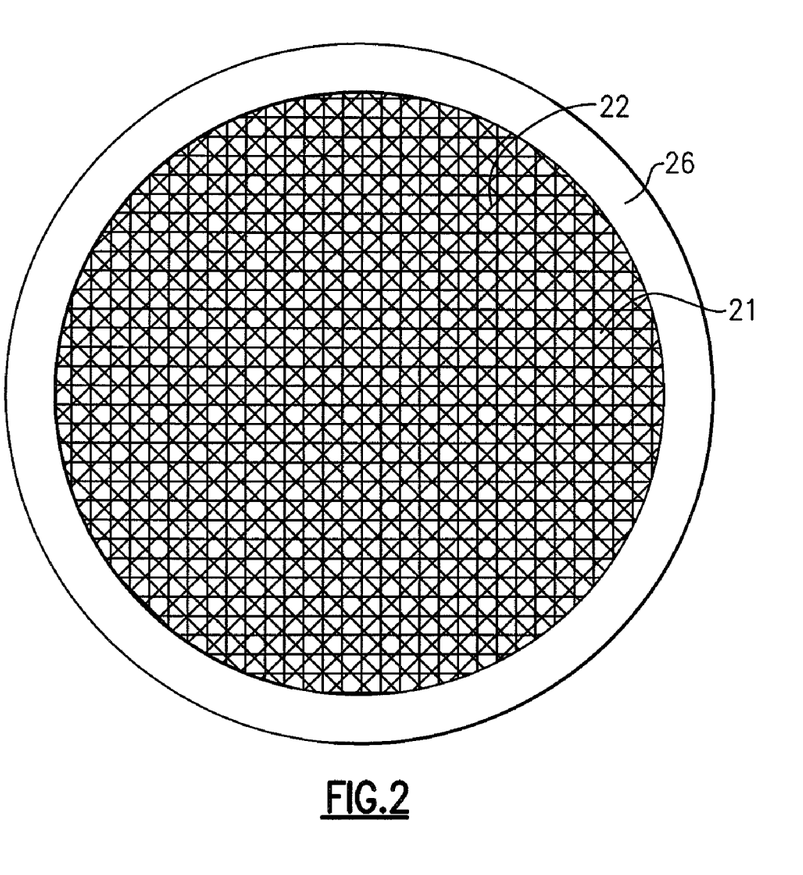
FIG. 2 is a bottom view of the lighting device depicted in FIG. 1.

FIGS. 1 and 2 depict a first embodiment of a lighting device in accordance with the present inventive subject matter. Referring to FIG. 1, there is shown a lighting device 10 comprising a plurality of LEDs 11 and a first optical device 12. The first optical device 12 is substantially circular disc-shaped, and comprises a first optical device structure 13, a second optical device structure 14 and a third optical device structure 15.

The first optical device structure 13 comprises a first structure first surface 16 and a first structure second surface 17. The second optical device structure 14 comprises a second structure first surface 18 and a second structure second surface 19. The third optical device structure 15 comprises a third structure first surface 20 and a third structure second surface 21.

The second optical device structure 14 has an edge region 24 positioned between the second structure first surface 18 and the second structure second surface 19, a plurality of cavities 23 being formed in the edge region 24, an LED 11 being positioned within each of the cavities 23.

As shown in FIG. 1, the first structure second surface 17 is in contact with the second structure first surface 18, and the second structure second surface 19 is in contact with the third structure first surface 20.

The second optical device structure 14 has an index of refraction which is greater than the index of refraction of the first optical device structure 13 and the index of refraction of the third optical device structure 15.

As shown in FIG. 1, the LEDs 11 are positioned and oriented such that if they are illuminated, at least a portion of the light they emit will enter into the second optical device structure 14.

The third optical device structure 15 comprises a plurality of optical features 22, the optical features 22 being positioned such that if the LEDs 11 are illuminated, whereby at least a portion of the light emitted by the solid state emitters 11 enters into the second optical device structure 14, at least some of the light emitted by the LEDs 11 will exit the third optical device structure 15 from the third structure second surface 21.

Some of the LEDs 11 comprise a light emitting diode chip embedded within an encapsulant element, and luminescent material positioned within the encapsulant element. The luminescent material is positioned such that if the light emitting diode in the package is illuminated, at least a portion of the luminescent material is excited so as to emit luminescent material emitted light, and at least a portion of the light emitted from the light emitting diode will mix with at least a portion of the luminescent material emitted light.

The lighting device 10 further comprises a reflector 25. As shown in FIG. 1, the reflector is positioned such that if any light exits the first optical device structure 13 from the first structure first surface 16, at least a portion of such light will be reflected by the reflector 25 and will re-enter the first optical device structure 13 through the first structure first surface 16.

As shown in FIG. 1, the reflector 25 is positioned and oriented relative to the first optical device 12 such that a center of the first structure first surface 16, a center of the third structure second surface 21 and a center of the reflector 25 are substantially aligned.

The lighting device 10 further comprises a rim portion 26. As shown in FIG. 1, the rim portion 26 is positioned such that it blocks the LEDs 11 from view from a vantage point along a line segment spaced from and perpendicular to the third structure second surface 21 and extending from the third structure second surface 21 and away from the third structure first surface 20. As shown in FIG. 2, the rim portion 26 extends around an entire periphery of the third structure second surface 21.

Figure 3:
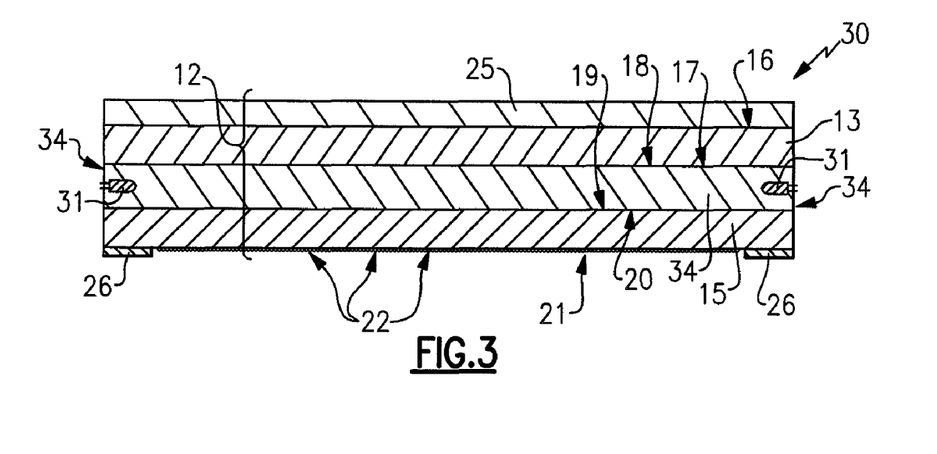
FIG. 3 is a sectional view of a second embodiment of a lighting device according to the present inventive subject matter.
Figure 4:
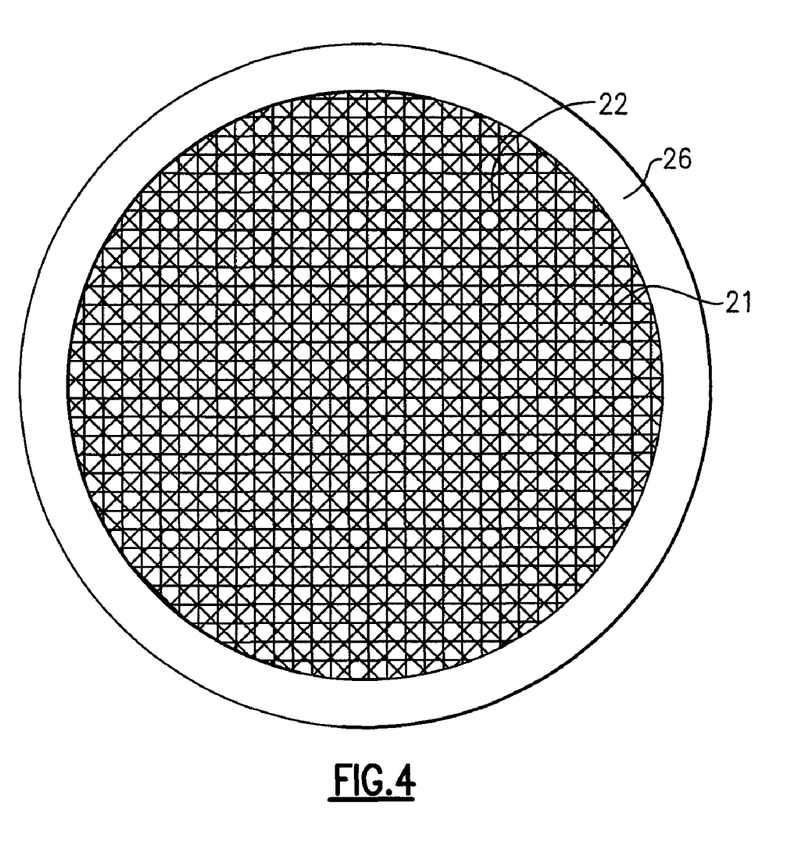
FIG. 4 is a bottom view of the lighting device depicted in FIG. 3.

FIGS. 3 and 4 depict a second embodiment of a lighting device in accordance with the present inventive subject matter. The lighting device 30 depicted in FIGS. 3 and 4 is identical to the lighting device depicted in FIGS. 1 and 2, except that in the lighting device depicted in FIGS. 3 and 4, the LEDs 31 are embedded in the second optical device structure 34 (rather than being positioned in cavities, as is the case with the LEDs 11 positioned in the cavities 23 depicted in FIG. 1).

Figure 5:
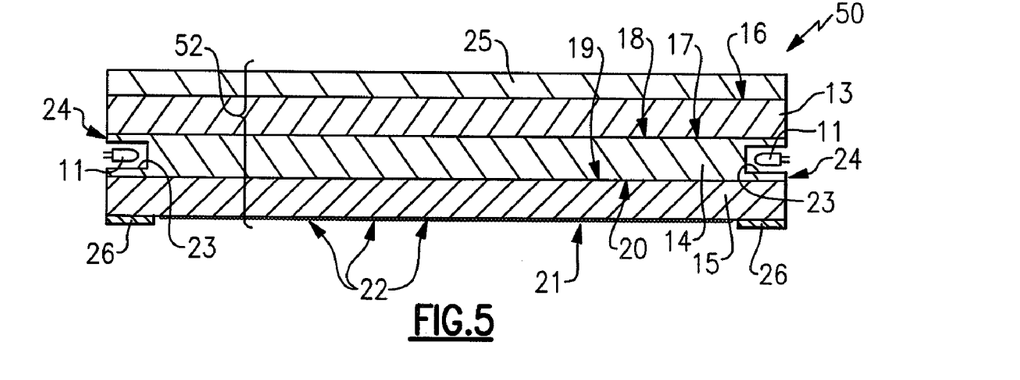
FIG. 5 is a sectional view of a third embodiment of a lighting device according to the present inventive subject matter.
Figure 6:
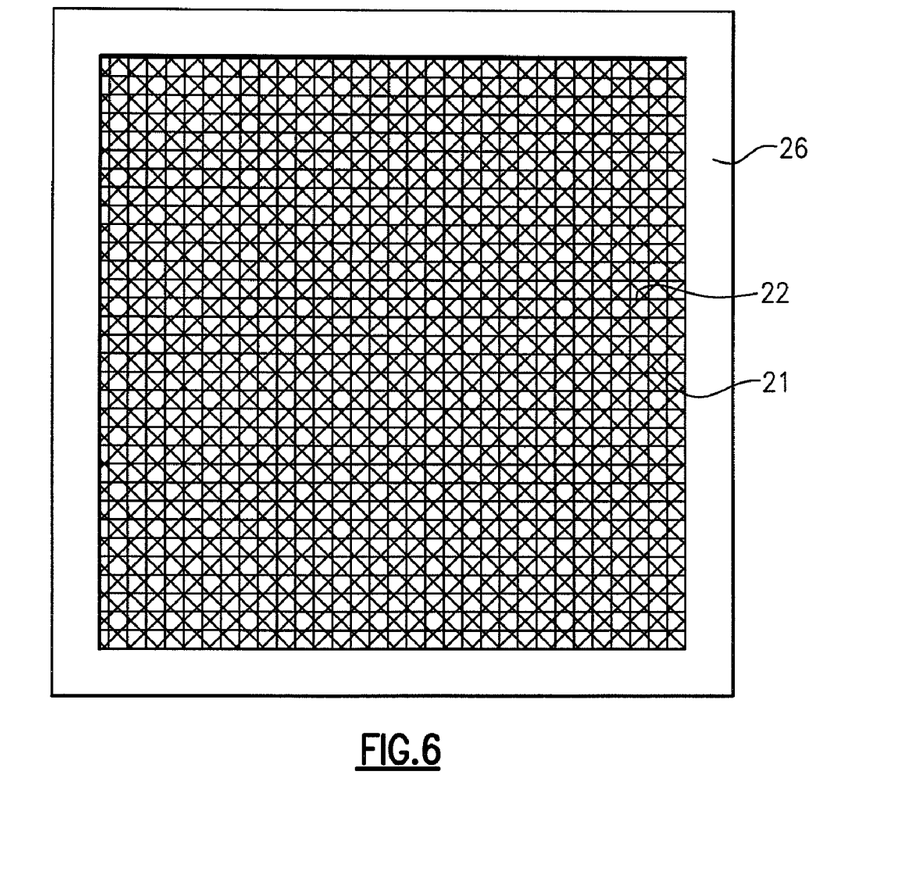
FIG. 6 is a bottom view of the lighting device depicted in FIG. 5.

FIGS. 5 and 6 depict a third embodiment of a lighting device in accordance with the present inventive subject matter. The lighting device 50 depicted in FIGS. 5 and 6 is identical to the lighting device depicted in FIGS. 1 and 2, except that in the lighting device depicted in FIGS. 5 and 6, the first optical device 52 is substantially square disc-shaped (rather than circular disc-shaped, as is the first optical device 12 in the device depicted in FIGS. 1 and 2).

Figure 7:
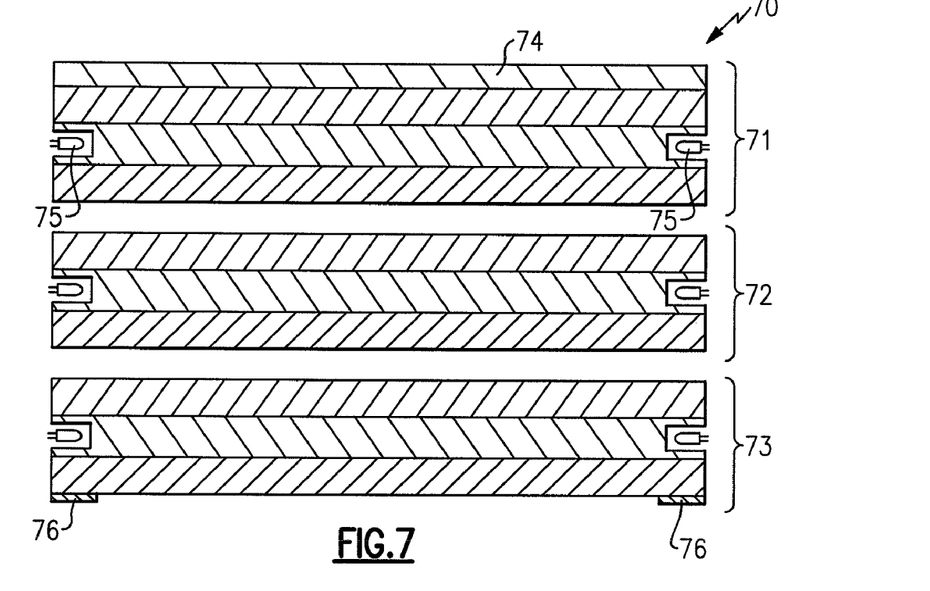
FIG. 7 is a sectional view of a fourth embodiment of a lighting device according to the present inventive subject matter.
Figure 8:
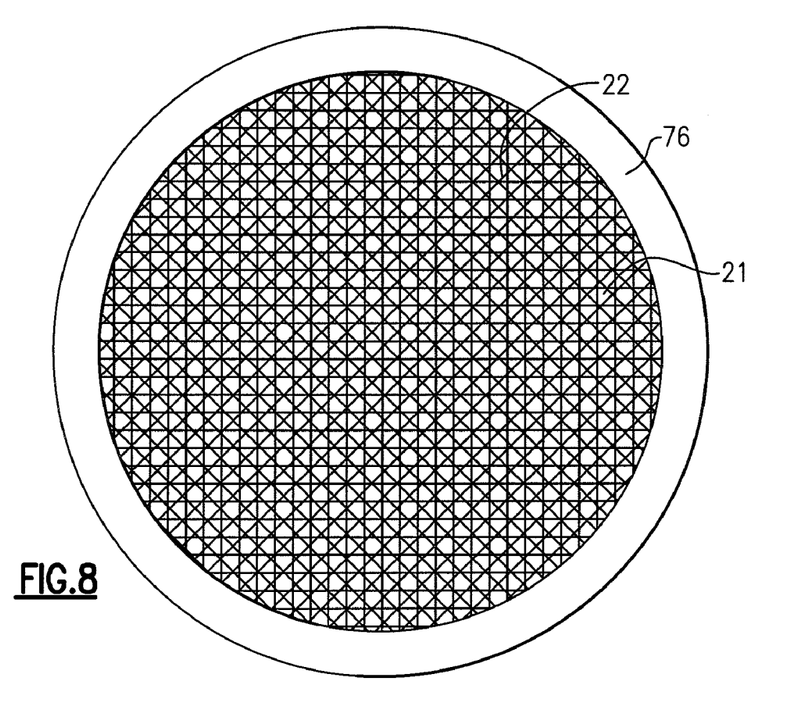
FIG. 8 is a bottom view of the lighting device depicted in FIG. 7.

FIGS. 7 and 8 depict a fourth embodiment of a lighting device in accordance with the present inventive subject matter. Referring to FIGS. 7 and 8, there is shown a lighting device 70 which comprises a first optical device 71, a second optical device 72 and a third optical device 73. Each of the three optical devices (i.e., the first optical device 71, the second optical device 72 and the third optical device 73) is similar to the first optical device 12 of the first embodiment, except that (1) only the first optical device 71 has a reflector 74 (i.e., the second optical device 72 and the third optical device 73 each do not have a reflector), and (2) only the third optical device 73 has a rim portion 76 (i.e., the first optical device 71 and the second optical device 72 each do not have a rim portion).

Referring to FIG. 7, the second optical device 72 is positioned and oriented relative to the first optical device 71, and the third optical device 73 is positioned and oriented relative to the second optical device 72, such that if the LEDs 75 in the first optical device 71 are illuminated, at least some of the light emitted by the LEDs 75 will exit from the third structure second surface of the third optical device 73.

Referring to FIG. 7, the second optical device 72 is positioned and oriented relative to the first optical device 71, and the third optical device 73 is positioned and oriented relative to the second optical device 72, such that a center of the first structure first surface of the first optical device 71, a center of the third structure second surface of the first optical device 71, a center of the first structure first surface of the second optical device 72, a center of the third structure second surface of the second optical device 72, and a center of the third structure second surface of the third optical device 73 are substantially aligned.

Any two or more structural parts of the lighting devices described herein can be integrated. Any structural part of the lighting devices described herein can be provided in two or more parts (which are held together, if necessary). Similarly, any two or more functions can be conducted simultaneously, and/or any function can be conducted in a series of steps.

Furthermore, while certain embodiments of the present inventive subject matter have been illustrated with reference to specific combinations of elements, various other combinations may also be provided without departing from the teachings of the present inventive subject matter. Thus, the present inventive subject matter should not be construed as being limited to the particular exemplary embodiments described herein and illustrated in the Figures, but may also encompass combinations of elements of the various illustrated embodiments.

Many alterations and modifications may be made by those having ordinary skill in the art, given the benefit of the present disclosure, without departing from the spirit and scope of the inventive subject matter. Therefore, it must be understood that the illustrated embodiments have been set forth only for the purposes of example, and that it should not be taken as limiting the inventive subject matter as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the inventive subject matter.

The invention claimed is:

1. A lighting device, comprising:
    at least a first solid state light emitter; and
    at least a first optical device,
    said first optical device comprising at least a first optical device structure, a second optical device structure and a third optical device structure,
    said first optical device structure comprising a first surface and a second surface,
    said second optical device structure comprising a third surface and a fourth surface,
    said third optical device structure comprising a fifth surface and a sixth surface,
    said second surface in contact with said third surface,
    said fourth surface in contact with said fifth surface,
    a first region of said second optical device structure comprising at least a portion of said fourth surface,
    a first region of said third optical device structure comprising at least a portion of said fifth surface,
    said first region of said second optical device structure having a first index of refraction,
    said first region of said third optical device structure having a second index of refraction,
    said first index of refraction greater than said second index of refraction,
    said first solid state light emitter positioned and oriented such that if said first solid state light emitter is illuminated, at least a portion of light emitted by said first solid state emitter will enter into said second optical device structure,
    at least one of (1) at least a portion of said first surface and (2) at least a portion of said sixth surface constituting an external surface of said lighting device.

2. A lighting device as recited in claim 1, further comprising at least a first luminescent material, said first luminescent material positioned such that if said first solid state light emitter is illuminated, and at least a portion of said first luminescent material is excited, at least a portion of light emitted by said first solid state emitter and at least a portion of light emitted by said first luminescent material will mix.

3. A lighting device as recited in claim 1, wherein:
    said third optical device structure comprises at least a first optical feature, said first optical feature positioned such that if said first solid state light emitter is illuminated, whereby at least a portion of light emitted by said first solid state emitter will enter into said second optical device structure, at least some light emitted by said first solid state emitter will exit said third optical device structure from said sixth surface.

4. A lighting device as recited in claim 1, wherein said first optical device structure has a substantially uniform index of refraction, said second optical device structure has a substantially uniform index of refraction, and said third optical device structure has a substantially uniform index of refraction.

5. A lighting device as recited in claim 1, further comprising at least a first luminescent material, said first solid state light emitter embedded within an encapsulant element in which at least a portion of said first luminescent material is also embedded.

6. A lighting device as recited in claim 1, wherein said first solid state light emitter is a light emitting diode.

7. A lighting device as recited in claim 1, further comprising at least a first luminescent material, said first luminescent material positioned such that if said first solid state light emitter is illuminated, at least a portion of light emitted by said first solid state emitter will contact at least a portion of said first luminescent material.

8. A lighting device as recited in claim 1, further comprising at least a second solid state light emitter, said second solid state light emitter positioned and oriented such that if said second solid state light emitter is illuminated, at least a portion of light emitted by said second solid state emitter will enter into said second optical device structure.

9. A lighting device as recited in claim 1, wherein said first solid state light emitter is embedded in said second optical device structure.

10. A lighting device as recited in claim 1, wherein said second optical device structure comprises at least a first cavity, and said first solid state light emitter is within said first cavity.

11. A lighting device as recited in claim 1, wherein said first solid state light emitter is embedded in an edge region of said second optical device structure, said edge region between said third surface and said fourth surface.

12. A lighting device as recited in claim 1, wherein said second optical device structure comprises at least a first cavity, said first cavity is formed in an edge region of said second optical device structure, said edge region is between said third surface and said fourth surface, and said first solid state light emitter is within said first cavity.

13. An illuminated enclosure, comprising an enclosed space and at least one lighting device as recited in claim 1, wherein said lighting device illuminates at least a portion of said enclosure.

14. An illuminated surface, comprising a surface and at least one lighting device as recited in claim 1, wherein if said lighting device is illuminated, said lighting device would illuminate at least a portion of said surface.

15. An illuminated area, comprising at least one item selected from among the group consisting of a structure, a swimming pool or spa, a room, a warehouse, an indicator, a road, a parking lot, a vehicle, a road sign, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, and a lamppost, having mounted therein or thereon at least one lighting device as recited in claim 1.

16. A lighting device as recited in claim 1, further comprising a rim portion, said rim portion positioned such that said rim portion blocks said first solid state light emitter from view from a vantage point along a line segment spaced from and perpendicular to said sixth surface and extending from said sixth surface and away from said fifth surface.

17. A lighting device as recited in claim 16, wherein said rim portion extends around an entire periphery of said sixth surface.

18. A lighting device as recited in claim 1, further comprising at least a first reflector, said first reflector positioned such that if any light exits said first optical device structure from said first surface, at least a portion of said light which exits said first optical device structure from said first surface will be reflected by said reflector and will re-enter said first optical device structure through said first surface.

19. A lighting device as recited in claim 18, wherein said reflector is positioned and oriented such that a center of said first surface, a center of said sixth surface and a center of said reflector are substantially aligned.

20. A lighting device as recited in claim 1, wherein said first optical device is substantially disc-shaped.

21. A lighting device as recited in claim 20, wherein said first optical device is substantially circular disc-shaped.

22. A lighting device as recited in claim 20, wherein said first optical device is substantially square disc-shaped.

23. A lighting device as recited in claim 1, further comprising at least a first power line, at least a second solid state light emitter and at least a first luminescent material region comprising a first luminescent material,
said second solid state light emitter positioned and oriented such that if said second solid state light emitter is illuminated so as to emit second solid state emitter light, at least a portion of said second solid state emitter light will enter into said second optical device structure,
wherein:
said first solid state light emitter, if illuminated, would emit light having a peak wavelength in the range of from 430 nm to 480 nm;
said first luminescent material, if excited, would emit light having a dominant wavelength in the range of from about 555 nm to about 585 nm;
said second solid state light emitter, if illuminated, would emit light having a dominant wavelength in the range of from 600 nm to 630 nm.

24. A lighting device as recited in claim 23, wherein if power is supplied to each power line in said lighting device:
a mixture of (1) light emitted by each solid state light emitter in said lighting device which, if illuminated, would emit light having a peak wavelength in the range of from 430 nm to 480 nm, (2) light emitted by each luminescent material region in said lighting device which, if excited, would emit light having a dominant wavelength in the range of from 555 nm to 585 nm, and (3) light emitted by each solid state light emitter in said lighting device which, if illuminated, would emit light having a dominant wavelength in the range of from 600 nm to 630 nm would, in an absence of any additional light, produce a mixed illumination having x, y coordinates on a 1931 CIE Chromaticity Diagram which define a point which is within ten MacAdam ellipses of at least one point on the blackbody locus on a 1931 CIE Chromaticity Diagram, and
a sub-mixture of light emitted by each solid state light emitter in said lighting device which, if illuminated, would emit light having a peak wavelength in the range of from 430 nm to 480 nm, and each luminescent material region in said lighting device which, if excited, would emit light having a dominant wavelength in the range of from 555 nm to 585 nm would, in an absence of any additional light, produce a sub-mixture illumination having x, y color coordinates which define a point which is within an area on a 1931 CIE Chromaticity Diagram enclosed by first, second, third, fourth and fifth line segments, said first line segment connecting a first point to a second point, said second line segment connecting said second point to a third point, said third line segment connecting said third point to a fourth point, said fourth line segment connecting said fourth point to a fifth point, and said fifth line segment connecting said fifth point to said first point, said first point having x, y coordinates of 0.32, 0.40, said second point having x, y coordinates of 0.36, 0.48, said third point having x, y coordinates of 0.43, 0.45, said fourth point having x, y coordinates of 0.42, 0.42, and said fifth point having x, y coordinates of 0.36, 0.38.

25. A lighting device as recited in claim 24, wherein said sub-mixture illumination has x, y color coordinates which define a point which is within an area on a 1931 CIE Chromaticity Diagram enclosed by first, second, third and fourth line segments, said first line segment connecting a first point to a second point, said second line segment connecting said second point to a third point, said third line segment connecting said third point to a fourth point, said fourth line segment connecting said fourth point to said first point, said first point having x, y coordinates of 0.32, 0.40, said second point having x, y coordinates of 0.36, 0.48, said third point having x, y coordinates of 0.41, 0.455, and said fourth point having x, y coordinates of 0.36, 0.38.

26. A lighting device as recited in claim 1, wherein:
a second region of said second optical device structure comprises at least a portion of said third surface,
a first region of said first optical device structure comprises at least a portion of said second surface,
said second region of said second optical device structure has a third index of refraction,
said first region of said first optical device structure has a fourth index of refraction, and
said third index of refraction is greater than said fourth index of refraction.

27. A lighting device as recited in claim 26, wherein said first index of refraction and said third index of refraction are substantially equal.

28. A lighting device as recited in claim 26, further comprising at least a second solid state light emitter and at least a second optical device,
said second optical device comprising at least a fourth optical device structure, a fifth optical device structure and a sixth optical device structure,
said fourth optical device structure comprising a seventh surface and an eighth surface, said fifth optical device structure comprising a ninth surface and a tenth surface,
said sixth optical device structure comprising an eleventh surface and a twelfth surface,
said eighth surface in contact with said ninth surface,
said tenth surface in contact with said eleventh surface,
a first region of said fourth optical device structure comprising said eighth surface,
a first region of said fifth optical device structure comprising said ninth surface,
a second region of said fifth optical device structure comprising said tenth surface,
a first region of said sixth optical device structure comprising said eleventh surface,
said first region of said fourth optical device structure having a fifth index of refraction,
said first region of said fifth optical device structure having a sixth index of refraction,
said second region of said fifth optical device structure having a seventh index of refraction,
said first region of said sixth optical device structure having an eighth index of refraction,
said sixth index of refraction greater than said fifth index of refraction,
said seventh index of refraction greater than said eighth index of refraction,
said second solid state light emitter positioned and oriented such that if said second solid state light emitter is illuminated so as to emit second solid state emitter light, at least a portion of said second solid state emitter light will enter into said fifth optical device structure,
said sixth optical device structure comprising at least a second optical feature, said second optical feature positioned such that if said second solid state light emitter is illuminated so as to emit second solid state emitter light, whereby at least a portion of said second solid state emitter light will enter into said fifth optical device structure, at least some of said portion of said second solid state emitter light will exit said lighting device from said twelfth surface.

29. A lighting device as recited in claim 28, further comprising at least a first luminescent material-containing region and a second luminescent material-containing region,
said first luminescent material-containing region positioned such that if said first solid state light emitter is illuminated, and at least a portion of said first luminescent material is excited, at least a portion of light emitted by said first solid state emitter and at least a portion of light emitted by said first luminescent material will mix,
said second luminescent material-containing region positioned such that if said second solid state light emitter is illuminated and at least a portion of said second luminescent material is excited, at least a portion of light emitted by said second solid state emitter and at least a portion of said light emitted by said second luminescent material will mix.

30. A lighting device as recited in claim 28, further comprising at least a first luminescent material-containing region and a second luminescent material-containing region,
said first luminescent material-containing region positioned such that if said first solid state light emitter is illuminated, at least a portion of light emitted by said first solid state emitter light will enter into said first luminescent material-containing region,
said second luminescent material-containing region positioned such that if said second solid state light emitter is illuminated, at least a portion of light emitted by said second solid state emitter light will enter into said second luminescent material-containing region.

31. A lighting device as recited in claim 28, further comprising at least a first reflector, said first reflector positioned such that if any light exits said first optical device structure from said first surface, at least a portion of said light which exits said first optical device structure from said first surface will be reflected by said reflector and will re-enter said first optical device structure through said first surface.

32. A lighting device as recited in claim 28, wherein said second optical device is positioned and oriented relative to said first optical device such that if said first solid state light emitter is illuminated, whereby at least some light emitted by said first solid state emitter will exit said third optical device structure from said sixth surface, at least a portion of said light emitted by said first solid state emitter which exits from said sixth surface will exit said sixth optical device structure from said twelfth surface.

33. A lighting device as recited in claim 28, further comprising at least a first luminescent material-containing region and a second luminescent material-containing region,
said first luminescent material-containing region positioned such that if said first solid state light emitter is illuminated and at least a portion of said first luminescent material is excited, at least a portion of light emitted by said first solid state emitter and at least a portion of light emitted by said first luminescent material will mix,
said second luminescent material-containing region positioned such that if said second solid state light emitter is illuminated and at least a portion of said second luminescent material is excited, at least a portion of light emitted by said second solid state emitter and at least a portion of said light emitted by said second luminescent material will mix.

34. A lighting device as recited in claim 28, further comprising a rim portion, said rim portion positioned such that said rim portion blocks said first solid state light emitter and said second solid state light emitter from view from a vantage point along a line segment spaced from and perpendicular to said twelfth surface and extending from said twelfth surface and away from said eleventh surface.

35. A lighting device as recited in claim 34, wherein said rim portion extends around an entire periphery of said twelfth surface.

36. A lighting device as recited in claim 28, wherein said first optical device and said second optical device are substantially disc-shaped.

37. A lighting device as recited in claim 36, wherein said first optical device and said second optical device are substantially circular disc-shaped.

38. A lighting device as recited in claim 36, wherein said first optical device and said second optical device are substantially square disc-shaped.

39. A method of lighting, comprising:
illuminating at least a first solid state light emitter to emit first solid state emitter light, said first solid state light emitter positioned and oriented such that at least a portion of said first solid state emitter light will enter into a second optical device structure of a first optical device in a lighting device,
said first optical device comprising at least a first optical device structure, said second optical device structure and a third optical device structure,
said first optical device structure comprising a first surface and a second surface,
said second optical device structure comprising a third surface and a fourth surface, said third optical device structure comprising a fifth surface and a sixth surface, said second surface in contact with said third surface, said fourth surface in contact with said fifth surface, a first region of said second optical device structure comprising at least a portion of said fourth surface, a first region of said third optical device structure comprising at least a portion of said fifth surface, said first region of said second optical device structure having a first index of refraction, said first region of said third optical device structure having a second index of refraction, said first index of refraction greater than said second index of refraction, and at least one of (1) at least a portion of said first surface and (2) at least a portion of said sixth surface constituting an external surface of said lighting device.

40. A method as recited in claim 39, wherein:

a second region of said second optical device structure comprises at least a portion of said third surface, a first region of said first optical device structure comprises at least a portion of said second surface, said second region of said second optical device structure has a third index of refraction, said first region of said first optical device structure has a fourth index of refraction, and said third index of refraction is greater than said fourth index of refraction.

41. A method as recited in claim 39, wherein:

said third optical device structure comprises at least a first optical feature, said first optical feature positioned such that at least some light emitted by said first solid state emitter which enters into said second optical device structure exits said third optical device structure from said sixth surface.

* * * * *